United States Patent
Upper

(10) Patent No.: US 6,440,518 B1
(45) Date of Patent: Aug. 27, 2002

(54) COATING FOR OPTICAL INFORMATION DISKS

(76) Inventor: Brandon L. Upper, 18205 Grevillea Ave., Apartment 6, Redondo Beach, CA (US) 90278

( * ) Notice: Subject to any disclaimer, the term of this patent is extended or adjusted under 35 U.S.C. 154(b) by 12 days.

(21) Appl. No.: 09/750,455

(22) Filed: Dec. 28, 2000

(51) Int. Cl.[7] .................................................. B32B 3/02
(52) U.S. Cl. ................ 428/64.1; 428/64.7; 430/270.12
(58) Field of Search .............................. 428/64.1, 64.4, 428/64.7, 457, 913; 430/270.12, 495.1, 945; 369/283, 288

(56) References Cited

U.S. PATENT DOCUMENTS 5,518,788 A * 5/1996 Invie .......................... 428/65.1
5,609,990 A * 3/1997 Ha .......................... 430/270.11
5,698,284 A * 12/1997 Kubota ..................... 428/64.7

* cited by examiner

*Primary Examiner*—Elizabeth Evans Mulvaney
(74) *Attorney, Agent, or Firm*—W. Edward Johansen

(57) ABSTRACT

A transparent coating is used on an optical information disk. The optical information disk is an injection-molded piece of clear poly-carbonate plastic and is impressed with microscopic bumps which are arranged as a single, continuous, extremely long spiral track of data. A thin, reflective aluminum layer is sputtered onto the optical information disc so that the thin, reflective aluminum layer covers the bumps. A thin acrylic layer is sprayed over the thin, reflective aluminum layer in order to protect it. The transparent coating is a composite material which is made of silica as the discontinuous phase and of a polytetrafluoro-ethylene-derived organic polymer as the continuous phase which leads to a fluorine-containing silica-based product. The transparent coating is applied by spin or dip from specific solutions at room temperature followed by a mild and short heat treatment.

1 Claim, 1 Drawing Sheet

COATING FOR OPTICAL INFORMATION DISKS

BACKGROUND OF THE INVENTION

The invention relates to a liquid composition which forms a transparent coating on the optical surface of an optical information disk in order to protect the optical surface of the optical information disk from being scratched.

In their article, entitled "Scratch-resistant single-layer antireflective coating by a low-temperature sol-gel route," published in the Proceedings of *SPIE*, Volume 1758, pages 135–149, Sol-Gel Optics II, edited by John D. Mackenzie in December 1992, Herve G. Floch and Phillippe F. Belleville stated that a quarter-wave-thick narrow-bandwidth antireflective coating has been developed for use on plastic substrates by a sol-gel route. This coating has revealed pronounced scratch-resistance and climatic-resistance under adverse conditions. The single-layer coating consists basically of a composite material made of silica as the discontinuous phase and of a polytetrafluoro-ethylene-derived (TeflonTM) organic polymer as the continuous phase. This leads to a fluorine-containing silica-based product so-called Fluosil-coating. The coating is applied by spin or dip from specific solutions at room temperature followed by a mild and short heat treatment. In addition to remarkable abrasion and environmental resistance properties, such coatings have displayed excellent laser-induced damage threshold levels surpassing uncoated substrates. Such a product has opened new perspectives concerning architectural optical thin-films and ophthalmic lenses.

It is known that the surfaces of solid substrates that have been subjected to treatments or machining to provide a polish, gloss, or another surface aspect, as required by technical or decorative requirements, must be protected by suitable coatings to prevent any alteration of the surface condition. Such protection is more necessary when the surface is more fragile or subject to the risks of alteration or degradation as in the case of, for example, glass, ceramics, and organic polymeric materials which may be scratched or opacified from the effects of friction, abrasion, or even shock.

U.S. Pat. No. 6,077,583 teaches a transparent protective cover for the play-side of an optical disk which is made of polycarbon film. The protective cover is annular in shape and is appropriately sized to fit the various disc formats. There is provided an inner crevice or groove that fits the inner molding of a disc allowing for greater structural integrity and which assists in the placement of the protector on the disc. The device is attached to the disc using several clips that are located around the perimeter.

U.S. Pat. No. 4,983,437 teaches a thin, flat, polymer, scratch resistant, user applied disc protector with self-adhesive backing which affixes to the top of an optical information disc to help eliminate possible damage from impact which would render the disc in a semi-unplayable or unplayable condition. This extra layer of user applied protection is prefabricated to proper size to adhesively secure to various optical mediums with a self-adhesive layer by an application method of installation on the top, protective side of the disc. Adhesive allows for permanent placement on the disc for convenience without hindering operation of the disc and without hindering readability of the context of the information lettering. This disc protector can include a removable peel-away backing.

U.S. Pat. No. 5,757,765 teaches a protection structure which is adapted for protecting a disc includes a film mounted on an underside of the disc for covering a data reading region of the disc. The film includes an inner rim portion abutting on an inner annular portion of the disc, and an outer rim portion abutting on an outer annular portion of the disc. A plurality of ribs each a extend radially and inwardly from the inner rim portion of the film and each abut on the inner annular portion of the disc, and a plurality of recesses are each defined between adjacent two of the ribs. An annular adhesive sheet forms an adhesive surface which can be adhered on each of the ribs and can be adhered on the inner annular portion of the disc via each of the recesses, thereby securing each of the ribs on the inner annular portion of the disc.

U.S. Pat. No. 5,743,965 teaches a disk coating system for forming a coating on a disk such as an optical information disk which transfers disks to and from a pair of spinners with first and second disk transfer mechanisms. The coating system further has an intermittently rotating turntable, an apparatus for supplying a coating material to each disk on the turntable at a predetermined position, and a system for curing a coating layer on each disk. The spinners for removing an excess amount of the coating material are placed between the turntable and the curing system. The first transfer mechanism is for transferring disks from the turntable to the spinners, and the second transfer mechanism is for transferring disks from the spinners to the curing system. The two spinners are substantially equidistant from a predetermined disk position on the turntable. The first transfer mechanism has two arms extending in two directions diverging from a pivot at a predetermined angle. With both arms, this transfer mechanism can transfer disks from the predetermined disk position on the turntable alternately to the first and second spinners at a high speed.

U.S. Pat. No. 4,736,966 teaches an optical data storage medium, such as a data card with a strip of optical data storage material, which has peelable transparent protective layers adhered above the storage material. When a protective layer becomes too scratched to read or write through, it may be removed by peeling. More than one layer may be adhered successively above one another, and removed one by one as they become scratched. The peelable protective layers are preferably adhesive tapes made of Aclar, Mylar, polyester, or other hard-to-tear polymers with pressure sensitive adhesive. One or more of the layers, and an underlayer between substrate or card base and the storage material may be a water barrier material such as a polytrichlorofluoroethylene.

U.S. Pat. No. 5,518,788 teaches an optical recording disk which has an anti-static hard coat layer provided on at least one surface of the disk. The hard coat layer includes a fluorinated ionic salt. A polymer includes a plurality of pendant fluorinated groups and optionally a nonionic fluorinated surfactant. The polymer comprising a plurality of pendant fluorinated groups is preferably a copolymer derived from monomers comprising a nonfluorinated vinyl monomer; and a vinyl monomer comprising a fluorinated group.

U.S. Pat. No. 5,935,673 teaches an optical disk which has a surface which is coated with a removable layer of a material that does not significantly alter the optical properties of the disc in order to protect the optical surface of optical information disk such as an optical information disk or a digital versatile disk. Whenever the coating layer may have become damaged, it is removed and replaced with a new layer.

U.S. Pat. No. 5,744,243 teaches a composition which produces durable coatings and a process for preparing a single-layer broad band antireflective coating on solid substrates, such as glass, ceramics, metals, and organic polymeric materials. The coating composition consists, in combination, acid catalyzed hydrolysis and condensation products of water-silane monomer mixture and a film forming amount of a polymer having functional groups selected from amino, hydroxy and carboxy, hydroxy and amino, amino and carboxy, and amino, hydroxy and carboxy. The process includes the steps of applying the aforesaid coating composition (or an acid catalyzed sol-gel coating composition) substantially free of preformed oxide sol and water soluble metal salt to the surface of a solid substrate, curing the applied coating, and treating the cured coating with an aqueous electrolyte solution for a time sufficient to produce a coating having graded porosity which is antireflective over a broad band of the visible spectrum.

U.S. Pat. No. 5,120,811 teaches a 1 to 8 micron organic/inorganic (epoxy/glass) wear surface coating over a clear, protective layer provides excellent stain and gloss protection. An acid hydrolyzed silicate is combined with an acid hydrolyzed silicone coupling agent; an epoxy monomer; a photoinitiator and silicon oil surfactant to produce a coating composition which is dried to remove alcohol/water solvent and U.V. cured.

U.S. Pat. No. 4,808,291 teaches apparatus for coating optical information disks which includes a rotating table which is loaded with removable carriers, each of which holds a substrate to be coated. The carriers are advanced to a loading position and are pushed from the table thereat into a hollow cylinder. Each carrier has a pair of O-rings on its periphery which are squeezed against the inside surface of the cylinder to effect a double seal. Each carrier pushes the carrier ahead of it up through the cylinder in a train like fashion. Along the cylinder there are vacuum stations which act to pump down and degas the substrates. Apertures are provided in the vacuum stations and these apertures are formed to permit the O-rings to expand as the carriers pass by the apertures without causing the O-rings to be cut or scored. Within a vacuum chamber there is included a vapor trap which helps remove water vapor from the substrates during the degassing operation.

U.S. Pat. No. 5,571,041 teaches a method which repairs and refinishes an audio and video optical information disk having a scratch or a plurality of scratches on a plastic cover bottom side of the disk. The scratch interfering with a laser beam reading digital information upwardly through the bottom side of the disk. The top-side of the disk having a thin film layer of the recorded digital information secured thereon. The interference by the scratch causing an unwelcome "skip" during the play of the disk thereby lending its playing qualities unacceptable. The method of repair includes first inspecting the disk to determine the depth of the scratch. If the scratch is deep, a heavy cut, medium cut and fine cut cleaner may be used. The top-side of the disk is then placed against the soft covered wheel and secured thereto. As the disk is spun at low rpm, the heavy cut cleaner is applied evenly across the surface of the bottom side of the disk using a clean cotton cloth or cotton pad. This step is repeated at higher rpm using a medium cut cleaner and then a fine cut cleaner is used. A clear plastic cleaner and a clear plastic polish are then applied using a cotton pad. The disk is then finally inspected for any remaining scratches. To further enhance the repair of the disk and extend the playing life of the disk, a clear plastic cover is applied to the top side of the disk to protect the recorded data thereon from permanent damage.

U.S. Pat. No. 5,791,467 teaches a protective cover for an optical disk, such as an optical information disk, which includes a flexible and transparent base portion for covering one side of the optical disk. A first retaining portion is affixed to the top of the base portion so as to define a pocket for snugly receiving and frictionally retaining a portion of an optical disk. A second retaining portion is affixed to the top of the base portion at a distance from the first retaining portion. The second retaining portion defines another pocket for receiving and retaining another portion of the optical disk. Since the cover is transparent and snugly receives the optical disk, digitally encoded data may be readily obtained from the optical disk with conventional equipment, like an optical information disk player, while the cover is positioned over the disk.

U.S. Pat. No. 5,922,430 teaches an optical information disk protector for an optical data storage disk which includes a thin, transparent sheet having an inside diameter being larger than an inner hole of the disk and the sheet extending within and being bounded by a main region for placement against a first side of the disk, and approximately 24 circumferentially spaced support portions extending radially outwardly from the main region to a distance being greater than a thickness of the disk beyond the disk outside diameter. Each support portion has a bridge width being not greater than 2 percent of the disk outside diameter within a bridge region that is concentric with the inside diameter and extends from the disk outside diameter radially outwardly a distance corresponding to the disk thickness. A retainer holds the support portions folded against a second side of the disk when the main region of the sheet is placed against the first side of the disk, the inside diameter of the sheet being maintained concentric with the disk outside diameter by the bridge portions engaging outside edge portions of the disk, the retainer being a thin, sheet having an inside diameter larger than the inner hole of the disk, the sheet being smaller than the disk and having adhesive applied to one side for contacting the support portions.

U.S. Pat. No. 5,910,932 teaches an optical disc system which uses a rewritable optical disc with a light-transmitting cover and an objective lens for bundling or focusing a light beam on a recording layer of the optical disc in order to perform recording and/or reproducing of information. The recording layer is formed of a phase-change material. The thickness of the light-transmitting cover falls within the range of 0.05 mm to 0.6 mm, the numerical aperture (NA) of the objective lens is set to fall within the range of 0.55 to 1.10, and the wavelength of the light beam is selected to be between 100 nm to 780 nm.

U.S. Pat. No. 4,485,130 teaches a basic liquid composition which includes, in solution in at least one organic solvent, with or without water, from 10 to 40% of a hard-enable organosilicic compound resulting from a first hydrolysis reaction achieved at a temperature lower than 50° C. in the presence of a carboxylic acid and water on at least one R'Si(OR)4 alkoxysilane with n=1 or 2, in association or without association with at least one Si(OR")4-alkoxysilane, then, a second hydrolysis at a temperature lower than 40° C. after removal of the formed volatile solvents and addition of a less volatile solvent and at least one R'''Si(OR1)3-alkoxysilane, said reaction being followed with the setting of the pH to between 3.5 and 5.5 by an organic base. It is known that solid surfaces that have been submitted to sometimes very extensive treatments or machinings to confer upon them polish, gloss or any other aspect as required by technical or merely decorative requirements or needs, must be protected by suitable coatings to prevent any risks of alteration of the conditions thereof. Such protection is the more necessary the more fragile the surface considered or when the latter is particularly subjected due to its very nature to such risks of alteration or degradation as in the case of for example glass or glass substitutes which are scratchable or opacifiable from the effect of friction, abrasion, or even shocks. Such scratching hazards are met moreover also in the case of other products such as plastic materials, ceramics, porcelain, earthenwares, stonewares, machined or polished metals, and the like. A number of coatings have already been proposed to prevent or resist such surface degradation; however, such coatings generally present among others at least one of the following deficiencies: insufficient adherence to carrier; insufficiently high scratching and/or abrasion strength; short transparency longevity; short hardness longevity; poor cracking strength; loss of protective efficiency under the effect of water or moist atmospheres. Furthermore, the solutions from which such coatings are prepared have not sufficient stability in the course of time to permit durable storage. Their degradation with time is actually detrimental to the physical properties of the coatings to be realized.

This basic composition is suited for achieving transparent coatings or varnishes and stable in the course of time to permit storage thereof without any risks of degradation, on the one hand, and on the other hand, varnishes which have not any of the above-mentioned deficiencies, but on the contrary present all the following main properties, i.e. good adherence to the carrier, good scratching and/or abrasion strength, good hardness, good opacification strength longevity, good cracking strength, good resistance to water and moist atmospheres, and a sufficient thickness in the hardened varnish. More especially, the object of this invention is a basic composition for varnishes of the type comprising an organosiloxane or alkoxysilane hydrolysate.

U.S. Pat. No. 4,346,131 describes the preparation of a clear alcohol solution of acid hydrolyzed metal alkoxide which can be coated on a substrate and dried to produce an optical coating.

U.S. Pat. No. 4,480,072 teaches a useful means to crosslink organic and inorganic surfaces and particles. In his article, entitled SOL-GEL DERIVED DIP COATINGS Helmut Dislich discloses how mixtures of metal alkoxides may be used to condense mixed metal on a glass surface such as silicon-titanium, aluminum-magnesium, cadmium-tin, indium-tin, etc. In his article, entitled ORGANICALLY MODIFIED SILICATES AS INORGANIC-ORGANIC POLYMERS H. K. Schmidt describes combinations of linear organic polymer networks with three dimensional tetrahedron silicon networks using the sol-gel process, e.g. where combined polymerization of methacrylate and condensation of $Ti(OR)_4/Si(OR)_4$/epoxy-$Si(OR)_3$ produce a reinforced system with increased tensile strength and scratch resistance.

Japanese Application 86/25,739 teaches antifogging tile coatings where silica is bonded to polyvinyl alcohol using hydrolyzed [3-(glycidyloxy)propyl]trimethoxysilane.

European Patent Application 222,582 teaches an ultraviolet curable composition with good adhesion to glass comprising epoxy resin, poly-organosiloxane, aromatic onium salt and acrylate resin.

British Patent Application GB 2,177,093 teaches an ultraviolet curable coating composition which includes multifunctional glycidyl or cycloaliphatic epoxy oligomer, hydrolyzed silane coupling agent treated inorganic filler and photoinitiator for reaction of epoxy groups. Still, in spite of all the known art and available compositions of matter, a need existed to provide protective wear surfaces which could be conveniently produced without adverse environmental effects.

U.S. Pat. No. 4,753,827 teaches an organoalkoxy-silane/metal oxide sol-gel composition. The organoalkoxy-silane is of the general formula $R_x Si(OR')_{4-x}$ wherein R is an organic radical, R' is a low molecular weight alkyl radical, and x is at least 1 and less than 4, is partially hydrolyzed in organic solution and reacted with a titanium or zirconium alkoxide of the general formula $M(OR'')_4$ wherein M is titanium or zirconium and R" is a lower alkyl radical. The composition is hydrolyzed, dried and condensed to form an organosiloxane/metal oxide abrasion-resistant coating on a substrate.

U.S. Pat. No. 3,004,863 teaches a method which increases the scratch resistance of glass by applying to the glass surface an acidic aqueous solution of an organic titanate ester composition and heating at a temperature sufficient to anneal the glass.

U.S. Pat. No. 3,582,395 teaches a method which increases the scratch resistance of glass by treating the surface at a temperature between the strain point and the softening point with an alkylsilyl titanate to form a protective coating of silica-titania.

U.S. Pat. Nos. 3,986,997 and 4,027,073 teach an acidic dispersion of colloidal silica and hydroxylated silsesquioxane in an alcohol-water medium coated onto substrates such as acrylic lenses to provide an abrasion-resistant coating.

U.S. Pat. No. 4,242,403 teaches multi-layer automotive glazing units which include transparent substrates with protective covers and that combine penetration resistant body portions with abrasion resistant surfaces of a silica-reinforced organopolysiloxane.

U.S. Pat. No. 4,275,118 teaches a coating composition which includes an acidic dispersion of colloidal titania, colloidal silica and hydroxylated silsesquioxane in an alcohol-water medium which produces a hard, abrasion-resistant coating when cured on a plastic surface such as polycarbonate.

U.S. Pat. Nos. 4,390,373 and 4,442,168 teach a coating composition which includes an effective abrasion resisting amount of a colloidal dispersion containing colloidal antimony oxide and colloidal silica in a water-alcohol solution of the partial condensate of an organosilanol which upon curing forms an improved transparent, abrasion-resistant coating.

U.S. Pat. No. 4,405,679 teaches a coated shaped article of a polycarbonate type resin of abrasion resistance which includes a shaped polycarbonate substrate, an undercoat applied and cured on the substrate, and an overcoat applied and cured on the undercoat which includes a hydrolyzate of an epoxy-containing silicon compound, at least one member of the group of hydrolyzates of organic silicon compounds, colloidal silica and organic titania compounds, and a curing catalyst.

U.S. Pat. No. 4,477,499 teaches ultraviolet radiation resistant silicone resin coatings which have thermo-formability and shortened required aging achieved by the addition of a Lewis acid compound to the coating composition.

U.S. Pat. Nos. 4,500,669 and 4,571,365 teach transparent, abrasion-resistant coating compositions which include a colloidal dispersion of a water-insoluble dispersant in a water-alcohol solution of the partial condensate of silanol wherein the dispersant comprises metals, alloys, salts, oxides and hydroxides thereof.

European patent application No. 85110293.9 teaches carbon-containing monolithic glasses prepared by a sol-gel process involving a partial condensate of a silanol containing colloidal metal oxides such as $SnO_2$, $B_2O_3$ and $ZnO_2$.

U.S. patent application Ser. No. 915,344 teaches sol-gel compositions which contain silane and alumina, and abrasion resistant coatings produced therefrom.

The inventor incorporates the teachings of the above-cited patents into this specification.

SUMMARY OF THE INVENTION

The present invention is generally directed to a transparent coating which is used on an optical information disk. The optical information disk is an injection-molded piece of clear poly-carbonate plastic and is impressed with microscopic bumps which are arranged as a single, continuous, extremely long spiral track of data. A thin, reflective aluminum layer is sputtered onto the optical information disc so that the thin, reflective aluminum layer covers the bumps. A thin acrylic layer is sprayed over the thin, reflective aluminum layer in order to protect it.

In a first separate aspect of the present invention, the transparent coating is a composite material which is made of silica as the discontinuous phase and of a polytetrafluoroethylene-derived organic polymer as the continuous phase which leads to a fluorine-containing silica-based product.

In a second separate aspect of the present invention, the transparent coating is applied by spin or dip from specific solutions at room temperature followed by a mild and short heat treatment Other aspects and many of the attendant advantages will be more readily appreciated as the same becomes better understood by reference to the drawing and the following detailed description.

The features of the present invention which are believed to be novel are set forth with particularity in the appended claims.

DESCRIPTION OF THE PREFERRED EMBODIMENT

In his article, entitled "How Compact Disks Work," Marshall Brain stated that an optical information disk can store up to 74 minutes of music. The total amount of digital data which must be stored on an optical information disk is 44,100 samples per channel per second times 2 bytes per sample times 2 channels times 74 minutes times 60 seconds per minute=783,216,000 bytes. In order to fit more than 783 megabytes onto a disk only 12 centimeters in diameter requires that the individual bytes be very small. By examining the physical construction of the optical information disk one can begin to understand how small they are. An optical information disk is a fairly simple piece of plastic, about 1.2 millimeters thick.

Figure 1:
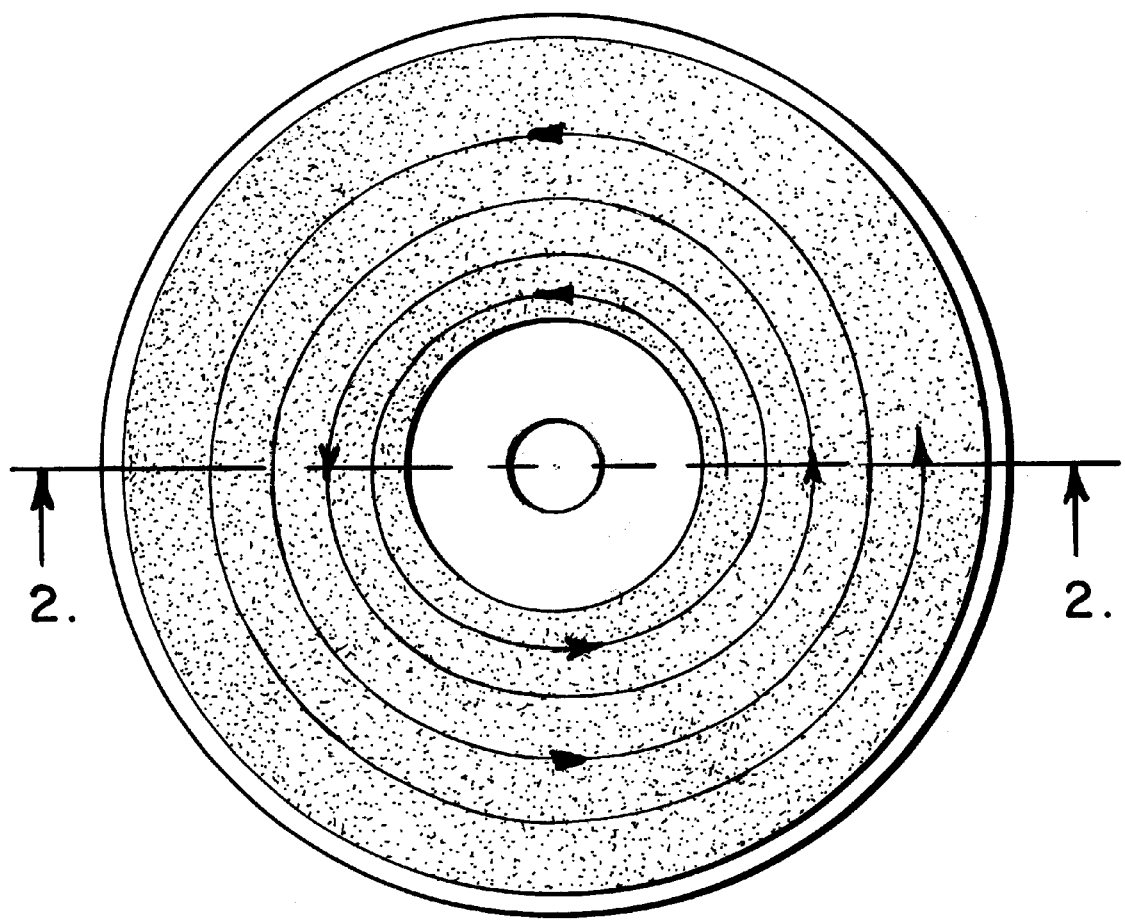
FIG. 1 is a top plan view of an optical information disk for use with a transparent coating in accordance with the present invention.
Figure 2:
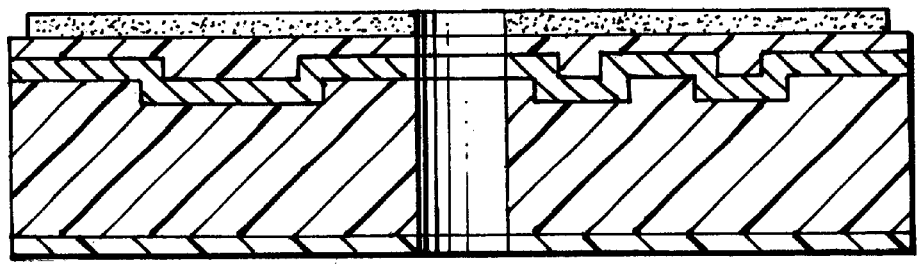
FIG. 2 is an elevation view in cross-section (not to scale) the optical information disk of FIG. 1 with a transparent coating which is used on an optical information disk.

Referring to FIG. 1 in conjunction with FIG. 2 an optical information disk 10 is an injection-molded piece of clear polycarbonate plastic. During manufacturing, the optical information disk 10 is impressed with microscopic bumps 11 which are arranged as a single, continuous, extremely long spiral track 12 of data. Once the optical information disk 10 is formed, a thin, reflective aluminum layer 13 is sputtered onto the optical information disc 10 so that the thin, reflective aluminum layer 13 covers the bumps 12. A thin acrylic layer 14 is sprayed over the thin, reflective aluminum layer in order to protect it. A label 15 is printed onto the thin acrylic layer 14.

The optical information disk 10 has a single spiral track of data, circling from the inside of the disk to the outside. The fact that the spiral track 12 starts at the center means that the optical information disk 10 can be smaller than 12 centimeters if desired. There are now plastic baseball cards and business cards which you can put into an optical information disk player. The optical information disk-business cards hold about 2 megabytes of data before the size and shape of the card cuts off the spiral. What the picture on the right does not even begin to impress upon one is how incredibly small the data track is—it is approximately 0.5 microns wide, with 1.6 microns separating one track from the next. And the elongated bumps that make up the track are each 0.5 microns wide, a minimum of 0.83 microns long and 125 nanometers high. Looking through the polycarbonate layer at the bumps 11, the bumps 11 look something like "pits." One often reads about "pits" on an optical information disk 10 instead of bumps 11. The bumps 11 appear as pits on the aluminum side, but on the side which the laser reads from the pits are bumps 11. The incredibly small dimensions of the bumps 11 make the spiral track on an optical information disk 10 extremely long. If one could lift the data track 12 off the optical information disk 10 and stretch it out into a straight line, it would be 0.5 microns wide and almost 3.5 miles long. To read something this small one needs an incredibly precise disc-reading mechanism.

Referring to FIG. 2 a transparent coating 20 is applied to the exposed polycarbonate plastic side of the optical information disk 10. The transparent coating 20 consists of a composite material. The composite material is made of silica as the discontinuous phase and of a polytetrafluoroethylene-derived organic polymer as the continuous phase. This leads to a fluorine-containing silica-based product so-called Fluosil-coating. The transparent coating 20 is applied by spin or dip from specific solutions at room temperature followed by a mild and short heat treatment. In addition to remarkable abrasion and environmental resistance properties, the coating 20 has displayed excellent laser-induced damage threshold levels surpassing non-coated optical information disk 10. The transparent coating 20 on the optical surface of the optical information disk 10 protects the optical surface from being scratched.

From the foregoing it can be seen that a transparent coating for an optical information disk has been described.

Accordingly it is intended that the foregoing disclosure and drawings shall be considered only as an illustration of the principle of the present invention.

What is claimed is:

1. A transparent coating for use on an optical information disk which is an injection-molded piece of clear polycarbonate plastic and which is impressed with microscopic bumps which are arranged as a single, continuous, extremely long spiral track of data with a thin, reflective aluminum layer being sputtered onto the optical information disc so that the thin, reflective aluminum layer covers the bumps and with a thin acrylic layer being sprayed over the thin, reflective aluminum layer in order to protect it, said transparent coating comprising a composite material which is made of silica as the discontinuous phase and of a polytetrafluoro-ethylene-derived organic polymer as the continuous phase which leads to a fluorine-containing silica-based product and which is applied by spin or dip from specific solutions at room temperature followed by a mild and short heat treatment.

\* \* \* \* \*